Oct. 14, 1924.
W. L. HOUSTON
AUTOMATIC VEHICLE BRAKE
Filed June 17, 1922
1,511,888
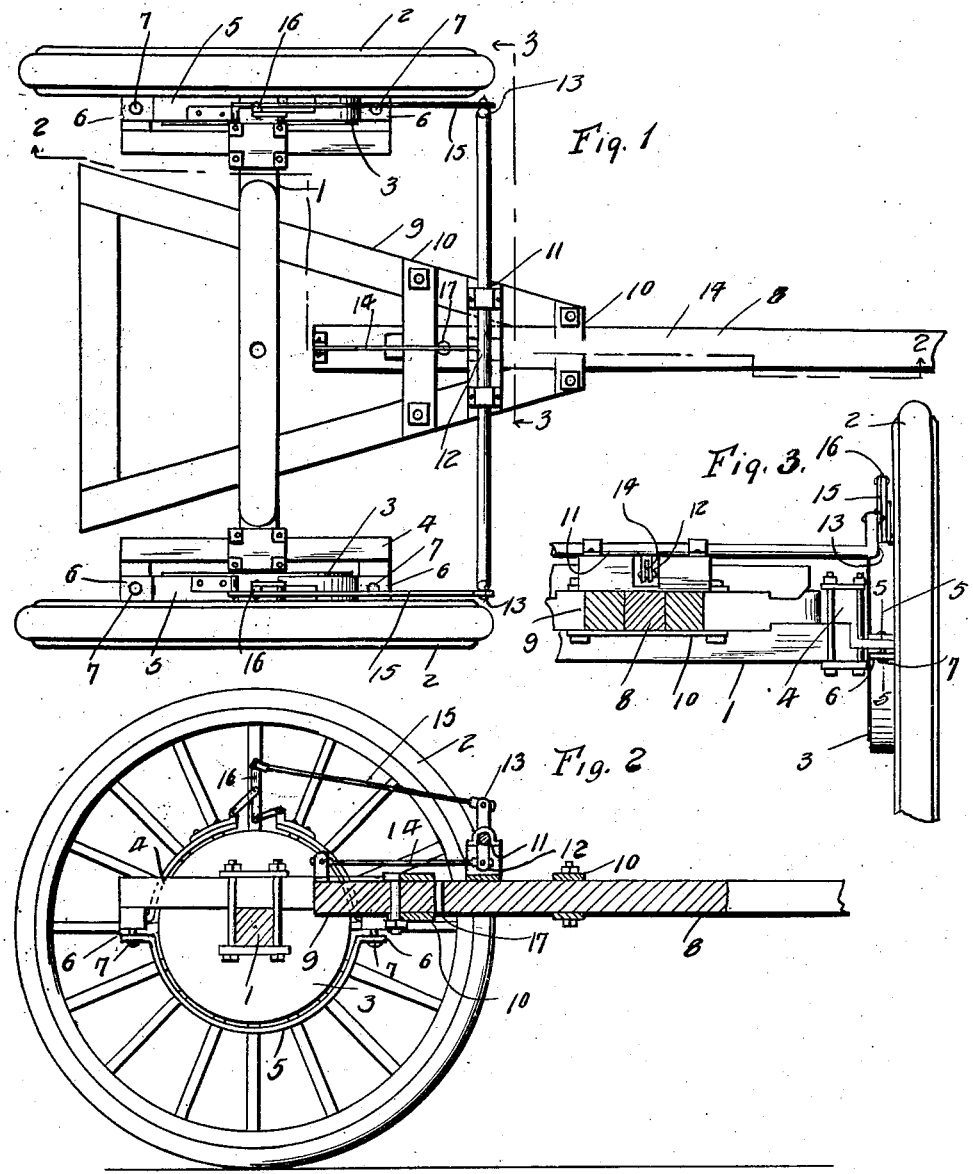
Inventor
W. L. Houston.
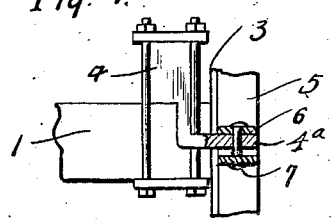
Attorney Patented Oct. 14, 1924.

1,511,888

UNITED STATES PATENT OFFICE.

WILLIAM L. HOUSTON, OF CARRSVILLE, KENTUCKY.

AUTOMATIC VEHICLE BRAKE.

Application filed June 17, 1922. Serial No. 568,903.

*To all whom it may concern:*

Be it known that I, WILLIAM L. HOUSTON, a citizen of the United States, residing at Carrsville, in the county of Livingston and State of Kentucky, have invented certain new and useful Improvements in Automatic Vehicle Brakes; and I do hereby declare the following to be a full, clear, and exact description of the invention, such as will enable others skilled in the art to which it appertains to make and use the same.

The invention relates to brake mechanism for a vehicle adapted to be drawn by horse or other power in order to prevent the vehicle from crowding or running down the tractive power when descending a grade.

One of the principal objects of the invention is to enable the use of soft-tread tires without injury thereto by the application of the brake.

In accordance with the invention, brake drums are attached to the vehicle wheels and brake bands cooperate therewith and have connection with a slidably mounted tongue which when moved rearwardly causes the brake bands to grip the brake drums and retard the movement of the vehicle when descending a grade and thereby prevent the vehicle from running upon the tractive power with the probable chance of an accident.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a plan view of a portion of the running gear of a vehicle provided with brake mechanism embodying the invention, Figure 2 is a vertical longitudinal section on the line 2—2 of Figure 1, Figure 3 is a transverse section on the line 3—3 of Figure 1, Figure 4 is a detail view showing the manner of connecting a brake band to its supporting beam, and Figure 5 is a sectional view taken on the line 5—5 of Figure 3.

Corresponding and like parts are referred to in the following description and designated in the several views of the drawings by like reference characters.

The numeral 1 designates an axle of the vehicle and 2 the wheels mounted thereon and provided with soft-tread tires. A brake drum 3 is provided for each of the wheels 2 and is located upon the inner side thereof and preferably attached to the spokes. A beam 4 is clipped or otherwise attached to each end of the axle 1 adjacent the inner side of the wheel 2 and its ends extend outwardly upon opposite sides of the brake drum 3. The brake supporting beams 4 are longitudinally disposed and extend crosswise of the axle to which they are attached midway of their ends. A brake band 5 is provided to cooperate with each of the brake drums 3 and is provided at opposite points with pairs of lugs 6 which engage the offset ends 4$^a$ of the brake beams 4. A pin 7 is provided for each pair of lugs 6 and connects the same to an end of the brake beam, both the lugs 6 and offset ends of the brake beam being provided with enlarged or elongated slots 4$^b$ to receive the pins 7, whereby provision is had for contraction and expansion of the brake band.

A tongue 8 is slidably mounted in any preferred way. For convenience the tongue is shown disposed between hounds 9 and upper and lower straps 10 connecting said hounds. A crossbar 11 arranged above the tongue 8 has a lower centrally disposed arm 12 and upper terminal arms 13. A link 14 connects the lower arm 12 with the sliding tongue 8. A link 15 connects each of the terminal arms 13 with a lever 16 to which the ends of the adjacent brake band 5 are connected so that rearward movement of the tongue 8 effects contraction of the brake bands and causes them to grip the brake drums 3 and prevent the vehicle from running wild when descending a grade.

It is observed that the soft-tread tires are not subjected to the wear which would result if the brake members acted directly thereon, such wear being sustained by the brake drums 3 and the brake bands 5, as will be readily understood. The sliding tongue 8 is provided with an opening 17 which is adapted to receive a pin (not shown), whereby to prevent rearward movement of the tongue when it is not required to apply the brake as when backing the vehicle.

What is claimed is:

1. A brake consisting of a drum, a supporting beam, a band for the drum provided in sections, the sections at adjacent terminals and at substantially diametrically opposite locations, being separated by said beam, and pins passing through the beam and connecting the sections together, and means operable to contract and expand the band.

2. A brake consisting of a drum, a band for the drum provided in sections, a supporting beam having offset end portions, the sections of the band being located above and below said end portions, connecting pins for the ends of the sections of the band passing through said sections and said offset portions, and means to actuate the sections to contract and expand the band.

In testimony whereof I affix my signature in presence of two witnesses.

WILLIAM L. HOUSTON.

Witnesses:
ROBERT C. CROTSER,
ROBT. CARR.